(12) United States Patent
Dodrill et al.

(10) Patent No.: US 8,448,059 B1
(45) Date of Patent: May 21, 2013

(54) APPARATUS AND METHOD FOR PROVIDING BROWSER AUDIO CONTROL FOR VOICE ENABLED WEB APPLICATIONS

(75) Inventors: Lewis Dean Dodrill, Richmond, VA (US); Satish Joshi, Glen Allen, VA (US); Ryan Alan Danner, Richmond, VA (US); Steven J. Martin, Richmond, VA (US)

(73) Assignee: Cisco Technology, Inc., San Jose, CA (US)

(*) Notice: Subject to any disclaimer, the term of this patent is extended or adjusted under 35 U.S.C. 154(b) by 1826 days.

(21) Appl. No.: 09/459,926

(22) Filed: Dec. 14, 1999

Related U.S. Application Data

(60) Provisional application No. 60/152,316, filed on Sep. 3, 1999.

(51) Int. Cl.
G06F 17/00 (2006.01)

(52) U.S. Cl.
USPC .......................................................... 715/205

(58) Field of Classification Search
USPC ........ 715/513, 501.1; 704/275, 270.1; 369/50
See application file for complete search history.

(56) References Cited

U.S. PATENT DOCUMENTS

| | | | |
|---|---|---|---|
| 4,837,798 A | | 6/1989 | Cohen et al. |
| 5,899,975 A | * | 5/1999 | Nielsen ........................ 704/270.1 |
| 5,903,727 A | * | 5/1999 | Nielsen ........................... 709/212 |
| 6,115,686 A | * | 9/2000 | Chung et al. ................... 704/260 |
| 6,233,318 B1 | * | 5/2001 | Picard et al. ................. 379/88.17 |
| 6,240,391 B1 | * | 5/2001 | Ball et al. ...................... 704/270 |
| 6,269,336 B1 | * | 7/2001 | Ladd et al. ..................... 704/270 |
| 6,349,132 B1 | * | 2/2002 | Wesemann et al. ......... 379/88.17 |
| 6,377,927 B1 | * | 4/2002 | Loghmani et al. ............. 704/275 |
| 6,493,434 B1 | * | 12/2002 | Desmond et al. ........... 379/88.17 |
| 6,523,022 B1 | * | 2/2003 | Hobbs ............................... 707/3 |
| 6,549,612 B2 | * | 4/2003 | Gifford et al. ................ 379/67.1 |
| 6,604,075 B1 | * | 8/2003 | Brown et al. ............... 704/270.1 |
| 6,636,831 B1 | * | 10/2003 | Profit et al. .................... 704/275 |
| 6,807,254 B1 | * | 10/2004 | Guedalia et al. ............. 379/88.1 |

(Continued)

OTHER PUBLICATIONS

W3C "Voice Browsers" W3C Workshop: Call for Participation and submitted Position Papers; Oct. 13, 1998, www.w3.org/Voice/1998/Workshop.*

(Continued)

*Primary Examiner* — Doug Hutton, Jr.
(74) *Attorney, Agent, or Firm* — Leon R. Turkevich

(57) ABSTRACT

A unified web-based voice messaging system provides voice application control between a web browser and an application server via an hypertext transport protocol (HTTP) connection on an Internet Protocol (IP) network. The web browser receives an HTML page from the application server having an XML element that defines data for an audio operation to be performed by an executable audio resource. The web browser selectively executes the audio operation based on whether the web browser detects the presence of the executable audio resource. If the web browser does not have the executable audio resource, then the web browser ignores the XML element, and merely presents any other recognized HTML tags. However if the web browser has access to an executable audio resource that understands the XML element, then the web browser executes the audio operation based on enhanced audio control specified by the XML element. Hence, a web browser can be used to provide enhanced voice control for voice enabled web applications, merely by possession of an executable audio resource that recognizes the XML element that specifies the enhanced audio control required for the audio operation to be performed.

40 Claims, 7 Drawing Sheets

```
                    190

<HTML>
        <HEAD>
        <TITLE> Hello </TITLE>
        <BODY>
                <FORM>
         208         (Form contents)
                </FORM>
         200    <EMBED file="http://server/wavdirectory/wavfile.wav" autostart = true>
                <XML>
         204         <PROMPTLIST>
                        <PROMPT type = "wav" name = "wavurl1"/>
                        <PROMPT type = "wav" name = "wavurl2"/>
         202         </PROMPTLIST>
         206         <RECORD upload = "upload URL"
                        filename = "local filename to use"
                        maxlength = "maximum record length"
                    />
                </XML>
        </HTML>

</body>
        </html>
```

U.S. PATENT DOCUMENTS

| | | | | |
|---|---|---|---|---|
| 6,922,733 | B1* | 7/2005 | Kuiken et al. | 709/246 |
| 6,941,273 | B1* | 9/2005 | Loghmani et al. | 705/26 |
| 2002/0006126 | A1* | 1/2002 | Johnson et al. | 370/356 |
| 2003/0208688 | A1* | 11/2003 | Bobo, II | 713/200 |
| 2005/0091057 | A1* | 4/2005 | Phillips et al. | 704/270.1 |

OTHER PUBLICATIONS

VoiceXML Forum, "Voice Extensible Markup Language", VoiceXML, Aug. 17, 1999, pp. 1-63.*

Robert R. Miner and Patrick D.F. Ion, "HTML-Math", Mathematical Markup Language Working Draft, Oct. 2, 1997, Available: http://www.xml.com/lpt/a/w3j/s2.math.html.*

WebReference, "XML and Perl: Embedding XML in HTML", Feb. 14, 1999, Available: http://www.webreference.com/perl/tutorial/1/xml.html.*

Kramer, Axel and Patricia Hallstein, "XML at Work—Introduction", May 1999. pp. 1-3, Available at: http://www.2far.com/publications/xml/XML-Introduction.html.*

Webopedia, "XML Data Island", available: http://www.webopedia.com/TERM/X/XML_data_island.html.*

Skyes, Rebecca, "IBM offers speech extension to XML", Feb. 19, 1999, Available at: http://www.cnn.com/TECH/computing/9902/19/speechm1.idg/index.html.*

Weiss, Aaron, Networker, vol. 3, No. 3 (1999), pp. 36-43, "XML gets down to business", pp. 1-7. Available: http://delivery.acm.org/10.1145/320000/315142/p36-weiss.html?key1=315142&key2=86968.*

W3C, Synchronized Multimedia Integration Language (SMIL) Boston Specification, Aug. 20, 1999, pp. 1-6, Available: www.w3.org/1999/08/WD-smil-boston-19990820/.*

W3C, XHTML 1.0: The Extensible Hypertext Markup Language, Aug. 24, 1999, Available: http://www.w3.org/TR/1999/PR-xhtml1-19990824/.*

XML in 10 points, Mar. 27, 1999, 3 pages, Bert Bos.

* cited by examiner

```
100 ──▶ <XML version = "1.0">
        <PLUGIN_CONTROL>
    102 ──▶ <PROMPTLIST type = "wav" prefetch = "true">
        104 ──▶ <PROMPT> wav1.wav </PROMPT>
        106 ──▶ <PROMPT> wav2.wav </PROMPT>
            </PROMPTLIST>
    110 ──▶ <USERINPUT>
        112 ──▶ <HOTKEY_PATTERN value = "(*[0-9]"/>
                <MAXLENGTH> 10 </MAXLENGTH>
            </USERINPUT>
        </PLUGIN_CONTROL>
```

FIG. 5A

```
108 ──▶ <PROMPT name = "wav1.wav" />
```

FIG. 5B

```
<HTML>
<HEAD>
<TITLE> Hello </TITLE>
<BODY>
        <FORM>
208              (Form contents)
        </FORM>
200  <EMBED file="http://server/wavdirectory/wavfile.wav" autostart = true>
     <XML>
204      <PROMPTLIST>
             <PROMPT type = "wav" name = "wavurl1"/>
             <PROMPT type = "wav" name = "wavurl2"/>
202      </PROMPTLIST>
206      <RECORD upload = "upload URL"
                 filename = "local filename to use"
                 maxlength = "maximum record length"
         />
     </XML>
</HTML>

</body>
</html>
```

FIG. 7

APPARATUS AND METHOD FOR PROVIDING BROWSER AUDIO CONTROL FOR VOICE ENABLED WEB APPLICATIONS

CROSS REFERENCE TO RELATED APPLICATIONS

This application claims priority from provisional application No. 60/152,316, filed Sep. 3, 1999, the disclosure of which is incorporated in its entirety herein by reference.

BACKGROUND OF THE INVENTION

1. Field of the Invention

The present invention relates to web browser control of audio operations for voice enabled web applications within a hypertext markup language (HTML) and hypertext transport protocol (HTTP) framework.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

FIG. 1 is a diagram illustrating the existing public switched telephone network. As shown in FIG. 1, the public switched telephone network 10 includes a wireline subnetwork 12, a wireless subnetwork 14, and a time division multiplexed (TDM) backbone subnetwork 16 configured for transporting voice data and other data between user devices 18 according to the existing public switched telephone network protocols. The subnetwork 16, for example, includes interexchange trunks for transporting voice data between interexchange carriers and/or local exchange carriers.

As shown in FIG. 1, the wireline subnetwork 12 includes telephony application servers 20 configured for providing voice applications 22 such as subscriber profile management, voice mail, call forwarding, etc. for the user devices 18a, 18b, and 18c coupled to the wireline subnetwork 12. As recognized in the art, the telephony application servers 20 include advanced intelligent network (AIN) components such as services control point (SCP) directories and service nodes (SN) configured for controlling the telephony applications 22. The wireline subnetwork 12 also includes telephony access services 24 configured for providing the user devices 18a, 18b, and 18c access to the wireline subnetwork using, for example, analog twisted pair connections or ISDN connections to a central office. The user devices 18a, 18b, and 18c, illustrated as a cordless telephone 18a, a fax machine 18b with an attached telephone, and an analog telephone 18c, are referred to herein as "skinny clients", defined as devices that are able to interface with a user to provide voice and/or data services (e.g., via a modem) but cannot perform any control of the application 22 or the protocol used to interface with the wireline subnetwork 12.

The wireless subnetwork includes wireless application servers 26, and wireless access services 28 for providing wireless voice and data services to the wireless user devices 18d, 18e, and 18f. The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, interact with the wireless application 30 based on respective wireless protocols controlled by the wireless access services 28. The wireless application servers 26 control wireless services such as home location register (HLR) management, and service node (SN) telephony applications. "Tiny clients" are distinguishable from skinny clients in that the tiny clients tend to have even less functionality in providing input and output interaction with a user, and may not be able to send or receive audio signals such as voice signals at all. Examples of tiny clients include wireless user devices 18d, 18e, and 18f, as well as function-specific terminal devices. Note that tiny clients tend to be one-way (receive-only or transmit-only) devices.

In both cases, however, both skinny clients and tiny clients have no control of the respective applications 22 and 30 that are running within the respective networks. Rather, the applications 22 and 30 are executed exclusively by the servers 20 and 26. Moreover, both skinny clients and tiny clients have no control of the access protocol used to access the respective subnetworks 12 and 14; hence, the skinny clients and tiny clients are currently incapable of initiating access to another network using an alternative protocol, for example Internet protocol (IP). Consequently, the skinny clients and tiny clients rely exclusively on the service nodes of the servers 20 and 26 to provide the voice application services programmed in the applications 22 and 30, respectively. Although this exclusive control of the applications 22 and 30 by the servers 20 and 26 is advantageous in maintaining control over quality of service and reliability requirements, the applications 22 and 30 can only be developed and maintained by programmers having sufficient know-how of the public switched telephone network infrastructure. As a result, programmers familiar with open standards such as IP are unable to provide contributions in enhancing the applications 22 and 30 due to the limitations of the public switched telephone network paradigm.

FIG. 2 is a diagram illustrating the web client-server paradigm of an open standards-based IP network 40, such as the World Wide Web, the Internet, or a corporate intranet. The IP network 40 provides client-server type application services for clients 42a and 42b by enabling the clients 42 to request application services from remote servers using standardized protocols, for example hypertext transport protocol (HTTP). For example, the client 42a is a stand-alone personal computer or workstation that has its own application 44 for providing its own application services. The client 42a can access a remote web application server 46 that executes a different set of application services 48 via an IP-based packet switched network 50 using either remote access services 52 or local area network access services 54, if available. Similarly, the client 42b having only a browser 56 can also enjoy the services of the applications 44 and 48 by accessing the respective computers 42a and 46.

The clients 42a and 42b, referred to herein as "fat clients" and "thin clients", respectively, have the distinct advantage that they can initiate requests using IP protocol to any connected web server 46 to execute part or most of the applications 48 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

Hence, the web server paradigm enables the clients 42 to access any web server on the IP network 40. Moreover, the use of open protocols such as HTTP and HTML enable any client 42, regardless of its configuration, to access an HTML web page from a server that has no knowledge of the configuration of the requesting client; if the HTML web page received by the client includes information such as a specific HTML tag that is not recognizable by the browser 56, the browser 56 can merely ignore the unrecognized HTML tag.

Efforts at extending the voice applications 22 and 30 from the public switched telephone network to the IP network 40 have had limited success, primarily because the telephone protocols used in development of the applications 22 and 30 do not operate under the same paradigm as the IP network 40. For example, the telephony applications 22 and 30 are state aware, ensuring that prescribed operations between the application servers 20 or 26 and the user devices 18 occur in a prescribed sequence. For example, operations such as call processing operations, voicemail operations, call forwarding, etc., require that specific actions occur in a specific sequence to enable the multiple components of the public switched telephone network to complete the prescribed operations.

The applications 44 and 48 running in the IP network 40, however, are state-less: the applications 44 and 48, in response to reception of a specific request in the form of a URL from a client 42, instantiate a program configured for execution of the specific request, send an HTML web page back to the client 42, and end the program that executed the specific request. Although state information may be passed between the browser 56 and a web application 48 using a data file referred to as a "cookie", some users prefer not to enable cookies on their browser 56; in addition, the passing of a large amount of state information as would normally be required for voice-type applications between the browser 56 and the web application 48 would substantially reduce the bandwidth available for the client 42.

In addition, HTML does not provide the type of control that is necessary to support voice applications. Specifically, HTML was designed as a set of specifications for embedding instructions within text that specifies to a browser how the text should be presented to the user. Hence, HTML is particularly effective for presenting on a browser a web page having text and image data, or forms data. However, HTML does not provide good media control: if instructions are embedded within an HTML page, there is no guarantee that a browser will execute the embedded instructions as intended by the web page designer.

Hence, efforts have been made to integrate the telephony applications 22 and 30 directly onto the IP network 40 by developing protocol translators that provide a termination between the telephony applications servers 20 and 26 and the web application servers 46. One such proposal is referred to as voice over IP, where telephony data from the telephony applications 22 and 30 are repackaged into IP packets for transmission across the IP network 50. These efforts, however, still require programmers who have substantial know-how of the telephony applications 22 and 30 and the public switched telephone network infrastructure. Moreover, the repackaging of telephony data into IP packets creates substantial problems in transmission of the telephony data, since the transport of IP data packets is not sequential and synchronous, as required for the voice applications.

Another attempt at performing voice applications over an IP network involves rewriting the telephony applications 22 and 30 as scripts in extensible markup language (XML), and sending the XML scripts over the IP network to an interpreter that is coupled to a telephone. The interpreter then plays the received XML scripts for the telephone. However this approach merely transfers some application functionality from the telephony applications 22 and 30 to the interpreter, and still requires telephony application engineers to write XML scripts of the applications 22 and 30. Hence, the IP network is used only for transporting the XML scripts, and does not take advantage of the open standards-based flexibility of the IP network that has provided enormous growth in web infrastructure and Internet commerce.

SUMMARY OF THE INVENTION

There is a need for an arrangement that enables voice applications to be implemented on an IP packet switched network using the open standards-based flexibility of the IP network.

There is also a need for an arrangement that enables voice applications to be implemented using HTTP and HTML open standards, enabling development of voice applications by individuals that do not have expertise in the public switched telephone network. For example, there is a need for arrangement that enables voice applications to be designed by web programmers.

There is also a need for an arrangement that enables voice applications to be implemented using an IP network, without the necessity of the public switched telephone network.

There is also a need for an arrangement that enables unified voice messaging services to be provided via an IP network to any device having a browser, regardless of the configuration of that browser.

There is also a need for an arrangement that enables a web browser to provide advanced audio control features to enable voice enabled web applications from a web server to be presented to a user of the web browser.

These and other needs are attained by the present invention, where a web browser receives an HTML page having an XML element that defines data for an audio operation to be performed by an executable audio resource. The web browser selectively executes the audio operation based on whether the web browser detects the presence of the executable audio resource. If the web browser does not have the executable audio resource, then the web browser ignores the XML element, and merely presents any other recognized HTML tags. However if the web browser has access to an executable audio resource that understands the XML element, then the web browser executes the audio operation based on enhanced audio control specified by the XML element. Hence, a web browser can be used to provide enhanced voice control for voice enabled web applications, merely by possession of an executable audio resource that recognizes the XML element that specifies the enhanced audio control required for the audio operation to be performed.

According to one aspect of the present invention, a method is provided in a device configured for executing a web browser according to hypertext transport (HTTP) protocol. The method includes receiving a hypertext markup language (HTML) page, from an HTTP connection, having at least one extensible markup language (XML) element defining data for an audio operation to be performed by an executable audio resource, and selectively executing by the web browser the audio operation based on detection of the executable audio resource by the web browser. The reception of an HTTP page that includes an XML element defining data for an audio operation to be performed enables the browser to receive advanced audio control functions from a web server via an HTTP connection, without any modification to the web browser. Moreover, the selective execution by the web browser of the audio operation based on detection of the executable audio resource ensures that web browsers having access to the executable audio resource can provide voice enabled web application interactivity with a user, while web browsers that lack the executable audio resource can merely ignore the XML element without any adverse effects. Hence, web programmers can design voice enabled web applications that are executable on a web server and that interact with web browsers by sending HTML pages having XML element, and receiving data such as input digits or sound files from the web browser according to HTTP protocol.

Another aspect of the present invention provides a processor-based device configured for executing audio operations based on a hypertext markup language (HTML) page received from a server according to hypertext transport protocol (HTTP). The device includes a web browser configured for selectively interpreting the HTML page, the HTML page including at least one of HTML tags and an XML element that defines data for an audio operation to be performed by an executable audio resource. The web browser selectively executes the audio operation specified by the XML element based on a determined presence of the executable audio resource by the web browser.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 5A and 5B are diagrams illustrating extensible markup language (XML) expressions usable for implementation of voice applications on the IP network.

FIG. 7 is a diagram illustrating a web page received by the browser in FIG. 6 having both hypertext markup language (HTML) tags and XML tags according to an embodiment of the present invention.

BEST MODE FOR CARRYING OUT THE INVENTION

The disclosed embodiment is directed to an arrangement for providing unified voice messaging services and data services via an IP network using a web browser having audio control for voice enabled web applications. The ability to provide unified voice messaging services via an IP network enables existing web servers on the World Wide Web or in corporate intranets to support telephone applications on a scalable and economic platform. Moreover, providing unified voice messaging services via an IP network enables use of open standards that permits web programmers to use existing web programming techniques to design and implement voice telephone applications.

Figure 3:
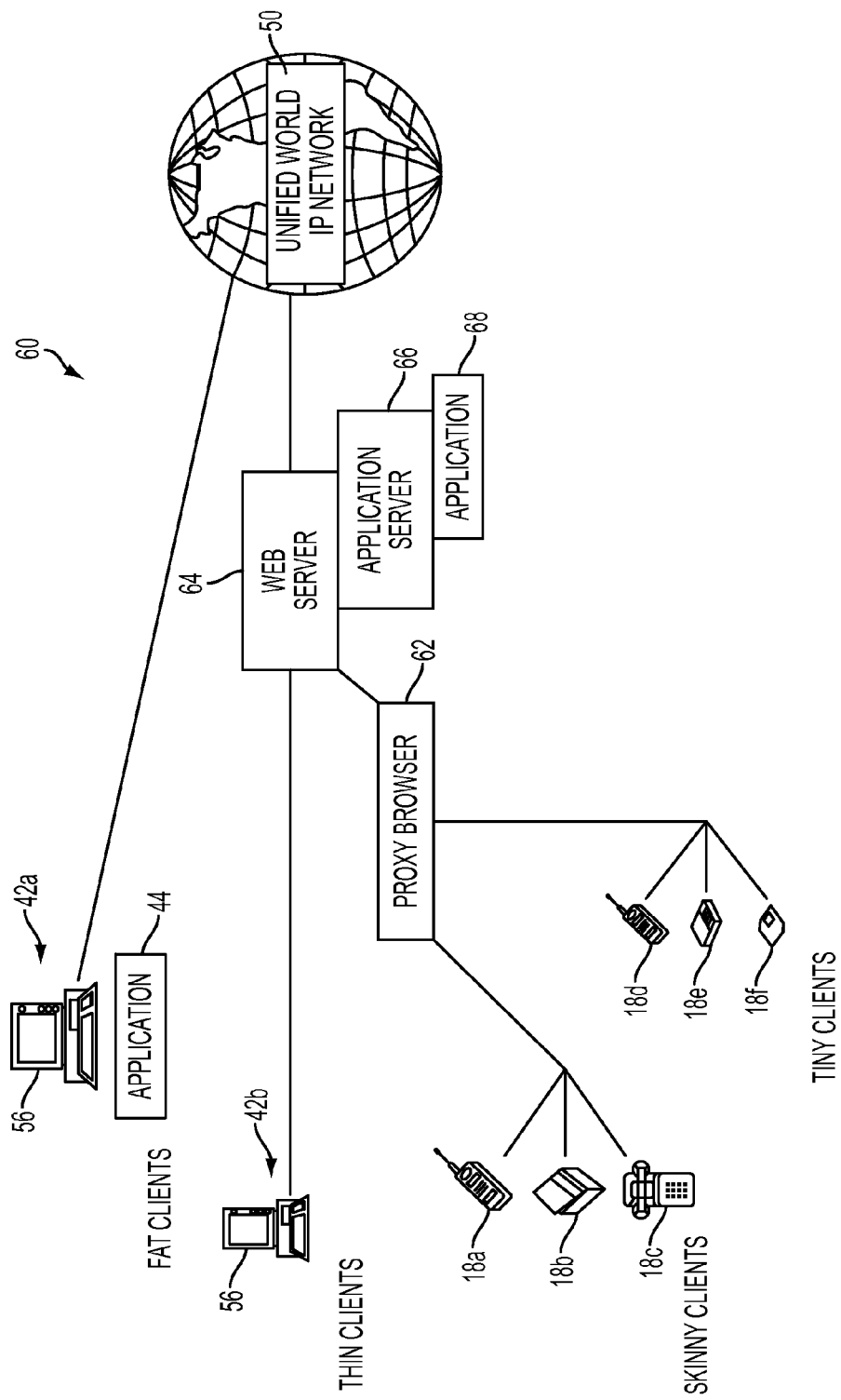
FIG. 3 is a block diagram illustrating a novel paradigm that enables unified voice messaging services and data services to be provided via an IP network using browser audio control according to an embodiment of the present invention.

FIG. 3 is a block diagram illustrating an architecture that provides unified voice messaging services and data services via an IP network using browser audio control according to an embodiment of the present invention. As shown in FIG. 3, each of the clients (tiny clients, skinny clients, thin clients and fat clients) are able to communicate via a single, unified architecture 60 that enables voice communications services between different clients, regardless of whether the client actually has browser capabilities. For example, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The skinny clients 18a, 18b, and 18c and the tiny clients 18d, 18e, and 18f also have access to the unified voice messaging services in the unified network 60 by accessing a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the unified messaging network 60.

Figure 1:
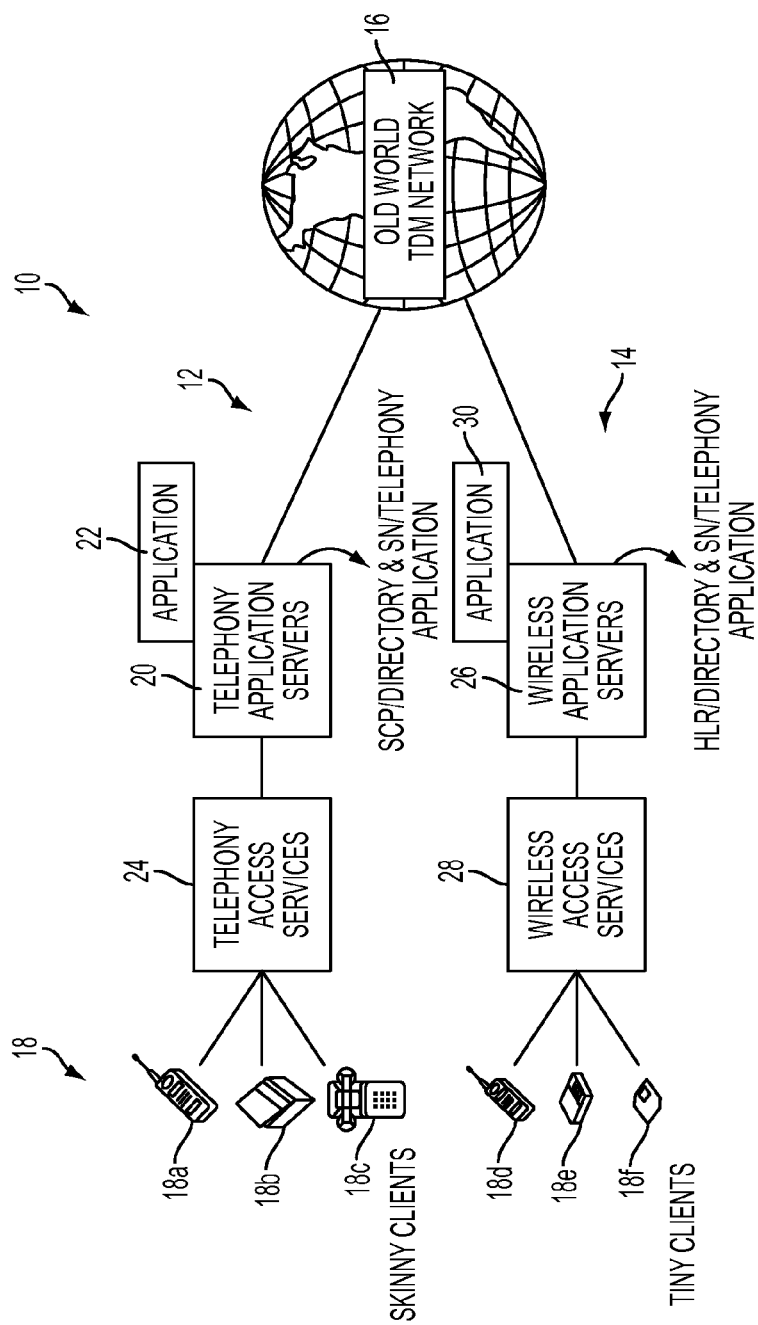
FIG. 1 is a block diagram illustrating an architecture paradigm of the existing public switched telephone network.
Figure 2:
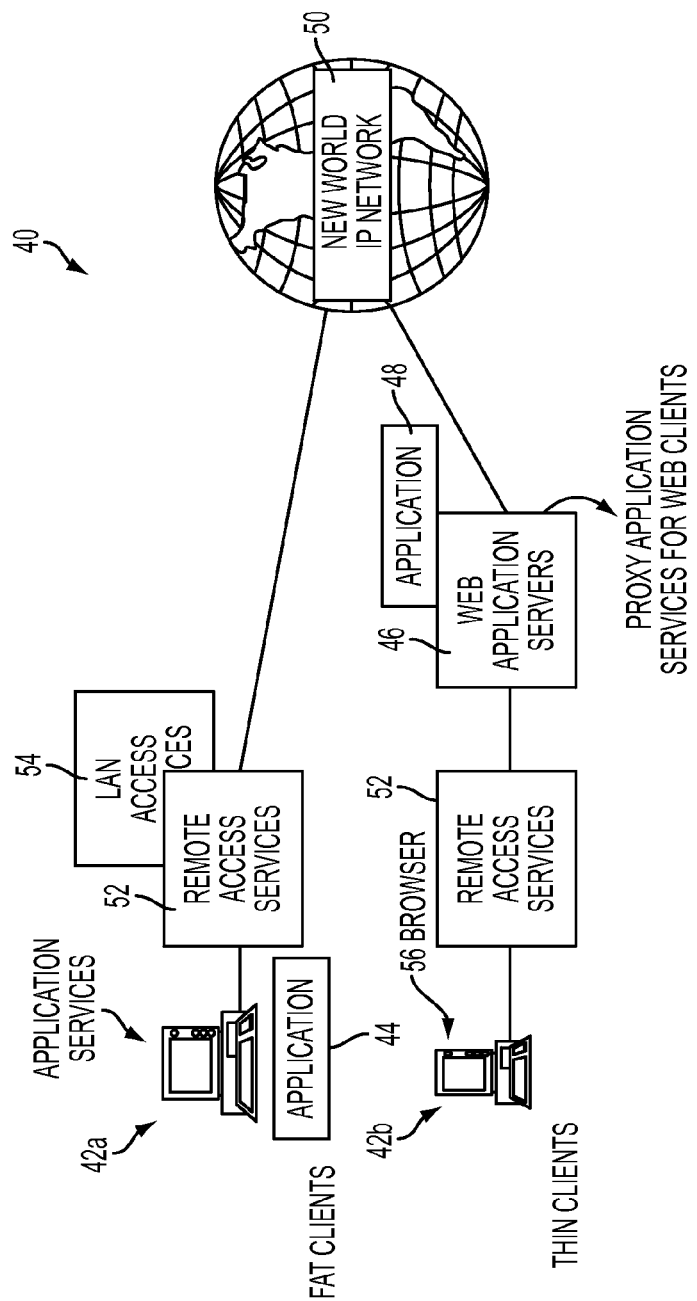
FIG. 2 is a block diagram illustrating an architecture of the existing web client-server paradigm of an Internet protocol (IP) network.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 may be similar to the web application server 46 of FIG. 2 by providing proxy application services for web clients. However, the web server 64 preferably serves as an interface between the browsers and an application server 66 that provides an executable runtime environment for XML voice applications 68. For example, the web server 64 may access the application server 66 across a common Gateway Interface (CGI), by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing. In particular, the application server 66 may either access static XML pages, or the application server 66 may access stored XML application pages (i.e., pages that define an application) and in response generate new XML pages during runtime and supply the generated XML pages to the web server 64. Since multiple transactions may need to occur between the browser 56 or 62 and the application server 66, the application server 66 may store for each existing session a data record, referred to as a "brownie", that identifies the state of the existing session; hence, the application server 66 can instantiate a procedure, return the necessary data, and terminate the procedure without the necessity of maintaining the instance running throughout the entire user session.

Figure 4:
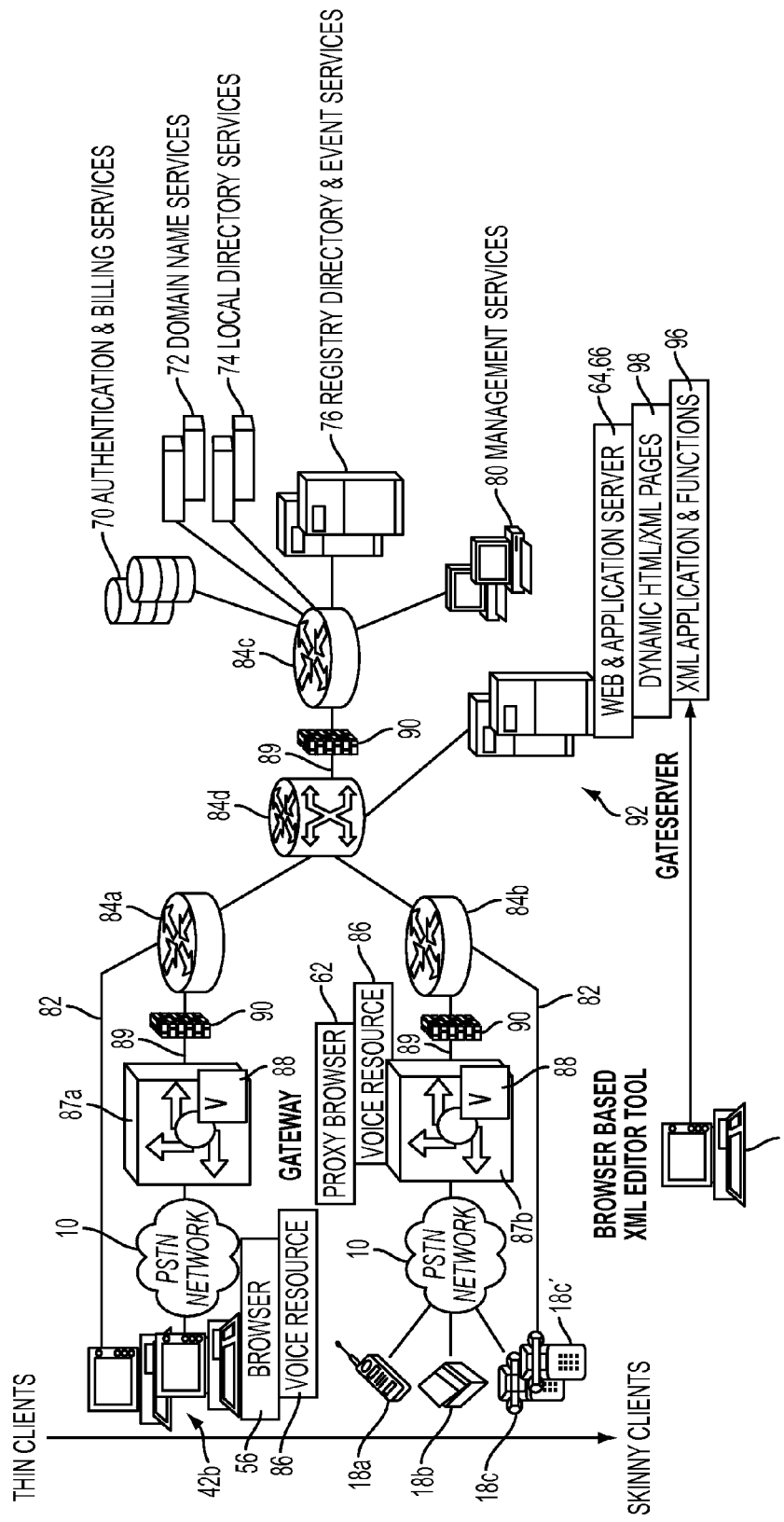
FIG. 4 is a diagram illustrating in further detail implementation of voice applications on the IP network of FIG. 3 according to an embodiment of the present invention.

FIG. 4 is a diagram that illustrates in further detail the network 60 of FIG. 3. As shown in FIG. 4, the arrangement of providing browser audio control for voice enabled web applications enables voice application services to be implemented in a web server paradigm for many different telephony services, including authentication and billing services 70, domain name services 72, local directory services 74, registry directory and event services 76, and management services 78.

FIG. 4 also illustrates in further detail the browser and web application server interaction. In particular, the thin clients 42b (and fat clients 42a) may be configured for accessing the web server 64 via a direct IP connection 82 to a router 84. The thin client 42b can directly access the web server 64 for voice enabled web application services if the thin client 42b has a browser 56 and an executable voice resource 86, for example an executable XML aware plug-in resource, described below, or a Java applet embedded within a received HTML page. Alternatively, the thin client 42b may access the web server 64 via the public switched telephone network 10, where an IP gateway 87a includes a voice over IP interface 88 that sends information to the server 64 using an HTTP connection 89 via a firewall 90.

Since the skinny clients and tiny clients 18 do not have browser resources, the skinny clients and tiny clients 18 access the proxy browser 62 via the PSTN 10 and the IP gateway 87b. The IP gateway 87b includes both a proxy browser 62 and a voice resource 86, enabling the IP gateway 87 to provide all audio control service for the skinny clients and tiny clients 18. Hence, the PSTN 10 is used merely for transfer of analog audio signals, with intelligent application processing being provided by the proxy browser 62. Note that if one of the telephones 18c' is an IP telephone, then it can access the server 64 via an IP connection 82; in this case, the browser internal to the IP telephone 18c' would process only audio functions, and would ignore any tags associated with text or image content.

As shown in FIG. 4, the web server 64, the application server 66, and the voice web applications 68 reside within a gateserver 92. The gateserver 92 includes a browser based XML editor tool 94 that enables a web programmer to design voice applications using XML pages, described below. The XML pages are stored as XML applications and functions 96, for example within a database accessible by the application server 66. The XML pages stored within the XML application and functions 96 may be stored as static pages to be fetched by the web server 64 and supplied to a browser, however the XML pages may also define the actual application to be executed by the application server 66 in runtime. Hence, the application server 66 may execute stored XML applications and functions 96, and in response generate dynamic HTML having XML tags, also referred to as HTML/XML pages.

According to the disclosed embodiment, the browsers 56 and 62 provide audio control for voice enabled web applications based on the HTML-XML pages supplied by the application server 66 to the web server 64 for transport across an HTTP connection. The browsers 56 and 62, as well as the voice resources 86, can be implemented as computer code that is stored on a computer readable medium (e.g., a hard disk drive, a floppy drive, a random access memory, a read only memory, an EPROM, a compact disk, etc). The following description elaborates on the combination of XML tags within HTML pages, enabling the voice resources 86 to provide browser audio control for voice enabled web applications.

FIGS. 5A and 5B are diagrams illustrating XML expressions usable for browser audio control. In contrast to HTML, XML does not define output, but rather XML defines data. Hence, XML enables a browser 56 or 62 to exchange data with a voice resource 86 such as a plug-in resource or a Java applet, or an application server 66 via a CGI. Hence, use of XML provides precise control between the voice resource 86 and the application server 66, across an HTTP connection, using a structured and open protocol as opposed to a closed, proprietary protocol. Hence, different voice applications can be developed and shared between multiple programmers based on the open architecture of XML, resulting in new opportunities for web programmers to develop and improve voice applications in a web based paradigm.

As shown in FIG. 5A, a set of XML tags may be generated, by the application server 66, that provide a set of controls for a plug-in resource. For example, the XML tag 100 specifies plug-in control elements to be used for controlling an XML aware plug-in resource. The plug-in control elements include a prompt list 102 that includes an attribute (prefetch) that instructs the plug-in resource 86 to automatically fetch the prompts 104 and 106, identified as audio files "wav1.wav" and "wav2.wav", from the application server 66 and play them sequentially as prompts. Note that conventional HTML web browsers could not execute more than one audio file at a time, since the browser would not know whether to play all the audio files simultaneously, or interrupt the playing of one audio file with another audio file, or play only one of the audio files. The extensible nature of XML elements, however, enables attributes to be defined for each XML element; hence, the XML aware plug-in resource 86 knows that it needs to prefetch all the .wav files specified in XML tags 104 and 106, and play them in sequence.

FIG. 5B illustrates an alternative format for specifying the prompts 104 and 106. In particular, the XML tag 108 is encased within tags, enabling a standard browser 56 that does not understand the prompt tag to easily discard/ignore the XML tag 108. Hence, the structure of FIG. 5A use more adapted for XML parsing, however an HTML browser that does not have an XML aware plug-in resource may misinterpret one of the prompts 104 or 106, and erroneously parse one of the prompts 104 or 106 as data to be displayed. Hence, the structure of FIG. 5B is preferable to insure that an HTML browser does not misinterpret an XML expression.

FIG. 5A and also illustrates an XML element 110 that defines hotkey pattern values in XML tag 112 that enables the XML aware plug-in resource 86 to initiate execution of a prescribed audio operation in response to detecting a single key input (e.g., *5) by immediately posting the single key input to the server and receiving another XML page that includes the prescribed audio operation, in contrast to HTML form tags, which cannot automatically submit data to a web server upon receipt of a digit. Hence, the ability to define hotkey pattern values enables a web application developer to use XML to define applications that perform voice mail type operations, such as responding to hotkey inputs. As described below, the appearance of hotkey pattern values is implemented merely by posting the input upon receipt thereof, and receiving another XML page.

Figure 6:
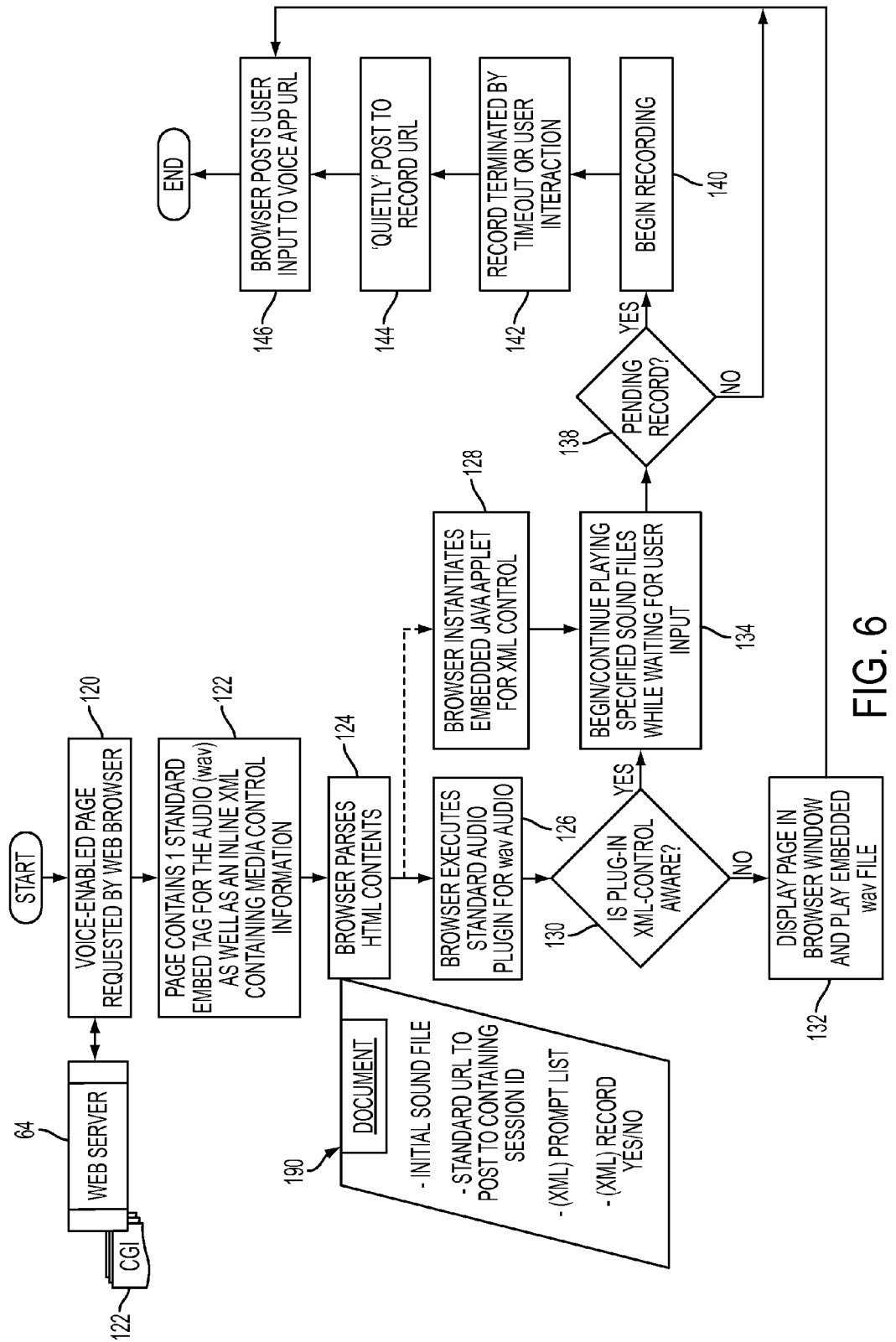
FIG. 6 is a flow diagram illustrating a method of providing browser audio control for voice enabled web applications according to an embodiment of the present invention.

FIG. 6 is a diagram illustrating a method of providing browser audio control for voice enabled web applications according to an embodiment of the present invention. The method begins in step 120 by the browser 56 or 62 requesting a voice enabled page from the web server 64 in step 120, for example by sending an http POST/GET message. The web server 64, in response to receiving the request, forwards the request to the application server 66 across a common gateway interface (CGI) 122. The application server 66 returns the requested page 190, and the web server 64 forwards the generated page 190 including HTML and XML tags to the browser 56 or 62 across an HTTP link in step 122.

FIG. 7 is a diagram illustrating the web page 190 received by the browser in step 122. The XML tags within the web page 190 typically include XML directives that specify, for example, prompts to play, input patterns to match (e.g., (0-9, *0-*9, #, etc.), and optionally timeout parameters and record control. As shown in FIG. 7, the web page 190 may include a standard embed tag 200 in HTML format, and an in line XML portion 202 that includes media control information, such as a prompt list 204 and control information 206 for a record operation to be performed by the XML aware plug-in resource 86.

The browser 56 or 62 parses the HTML contents in step 124. Specifically, the browser fetches the audio file "wavfile.wav" from the web server 64 and begins to play the file, for example as a welcome greeting. The browser 56 or 62 also may post to a standard URL to obtain a session identifier for use during user interaction with the application server 66. Upon receiving the audio file, the browser instantiates and audio plug-in resource in step 126. Alternatively, if the web page 190 includes an embedded audio resource, for example an embedded Java applet (not shown) configured for execution of XML documents, the browser instantiates the embedded Java applet for XML control in step 128.

Once the browser has initiated execution of the plug-in resource, then the plug-in resource is able to parse the XML portion 202 if the plug-in resource is XML control aware in step 130. If the plug-in resource is not XML control aware, but rather is a standard audio plug-in resource, then the browser 56 or 62 merely displays the HTML page within the browser window and plays the embedded audio file in step 132, disregarding the XML portion 202. However if the plug-in resource is XML control aware (or an XML aware Java applet is instantiated in step 128), then the XML aware audio resource 86 begins to play the audio files "wavurl1" and "wavurl2" in the prescribed sequence in step 134. For example, the XML aware audio resource 86 (e.g., the plug-in resource or the Java applet) plays a "Good Morning" prompt for wavurl1 and "Enter Your Phone Number followed by the Pound (#) Key" prompt for wavurl2, while waiting for an input pattern ([0-9] {7,9}#). This exemplary pattern ([0-9] {7,9}#) specifies to the XML aware audio resource 86 that a valid input is composed of any string of the characters 0 through 9 for a length of 7 to 9 digits, followed by a pound key. The XML aware audio resource 86 continues to play the audio files in the prescribed sequence while waiting in step 134 for the user to input a key entry. The browser matches the user input to the input pattern, and posts the data to the voice application URL (see step 146).

The audio resource 86 then checks in step 138 whether there is a record operation, as specified in the XML element 206, that is pending. If no record is pending, then the browser 56 posts to the voice application URL. Hence, the browser 56 can provide the appearance to the user that pressing a "hot key" causes an immediate response in the browser 56 to play another audio file, when actually the browser 56 merely posts the "hot key" input to the voice application URL, causing the server 64 to return another HTML/XML page including the sound to be played. Hence, the audio resource 86 does not need any intelligence in regards to digits pressed, other than to post the digits to the server.

If a record operation is pending, the audio resource 86 begins recording in step 140, for example by playing a tone to signal the user to begin speaking. The audio resource 86 continues to record in step 142 until a timeout occurs (e.g., 30 seconds), or the user enters a key indicating recording should be halted.

After recording the audio message spoken by the user, the browser 56 or 62 posts the data to the web server 64 in a prescribed sequence. Specifically, providing a user with the experience of a voice mail type application requires that certain operations be performed in a prescribed sequence; if the user presses a "1" to replay what has been recorded, then the recorded audio file must be posted to the application server 66 before the user input "1" is supplied, otherwise the application server 66 would not be able to replay the recorded audio file. Hence, the audio resource 86 "quietly" posts the recorded audio file to the "upload URL" specified in the record tag 206 in step 144. The browser then posts the user input (e.g., as specified in the HTML form 208) to another URL specified within the HTML form 208 in step 146.

According to the disclosed embodiment, advanced audio control is provided to a web browser by supplying in HTML page having an XML element that defines an audio operation to be performed by an executable audio resource. If the web browser does not have access to an executable audio resource that recognizes the XML element, then the web browser can merely disregard the XML element. However, use of an executable audio resource that is XML aware provides precise audio control between the web browser and the application server across an HTTP connection, enabling use of voice enabled web applications according to an open protocol. Hence, web programmers can now develop their own unified voice messaging systems using conventional web application development techniques, enabling users to personalize their voice mail systems or to develop more sophisticated web messaging systems between multiple users across the World Wide Web.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a device configured for executing a web browser according to hypertext transport (HTTP) protocol, the method comprising:
receiving a hypertext markup language (HTML) page, from an HTTP connection, having at least one extensible markup language (XML) element for controlling execution of an audio operation by an executable audio resource; and
selectively executing by the web browser the audio operation based on detection of the executable audio resource in the device by the web browser, including interpreting the at least one XML element by the executable audio resource in the device for the controlled execution of the audio operation;

wherein the selectively executing step includes executing the audio operation based on execution of the executable resource within the HTML page;

wherein the executable resource is a Java resource, the executing step including instantiating the Java resource by the web browser in response to parsing the XML element embedded within the HTML page.

2. The method of claim 1, wherein the selectively executing step includes executing the audio operation based on detection of the executable audio resource in the device as an executable plug-in resource registered with the web browser.

3. The method of claim 2, wherein the XML element specifies playing a plurality of prescribed audio files as a prompt for a user, the selectively executing step including playing the prescribed audio files in a sequence specified by the XML element.

4. The method of claim 3, wherein the playing step includes playing the prescribed audio files as concatenated prompts according to the sequence specified by the XML element.

5. The method of claim 4, wherein the playing step further includes interrupting the concatenated prompts in response to a detected user input, the method further including:
    posting the detected user input via the HTTP connection to a Uniform Resource Locator (URL) specified in the HTML page;
    receiving a second HTML page from the HTTP connection having a second XML element for controlling a second audio operation to be performed by the executable audio resource; and
    selectively executing the second audio operation based on detection of the executable audio resource.

6. The method of claim 3, wherein the HTML page includes a second XML element for controlling execution of one of a plurality of audio operations to be performed by the executable audio resource based on a corresponding user input, the method further including executing the one audio operation by the executable audio resource based on the corresponding user input.

7. The method of claim 6, wherein the step of executing the one audio operation includes initiating execution of the one audio operation in response to receiving a prescribed single key input as the user input.

8. The method of claim 7, wherein the step of initiating execution of the one audio operation includes submitting the prescribed single key input according to HTTP protocol to a destination specified in the second XML element.

9. The method of claim 6, wherein the step of executing the one audio operation includes initiating execution of the one audio operation in response to collection of a prescribed number of key inputs as the user input.

10. The method of claim 6, wherein the step of initiating execution of the one audio operation includes recording a voice input and sending the recorded voice input according to HTTP protocol to a destination specified in the second XML element.

11. The method of claim 10, further comprising posting a user input, that describes the recorded voice input, by the browser to a second destination specified by the HTML page in a prescribed sequence relative to the sending of the recorded voice input.

12. The method of claim 1, wherein the step of selectively executing the audio operation includes recording, by the executable audio resource, a voice input and sending the recorded voice input according to HTTP protocol to a destination specified in the XML element.

13. The method of claim 12, further comprising posting a user input, that describes the recorded voice input, by the browser to a second destination specified by the HTML page in a prescribed sequence relative to the sending of the recorded voice input.

14. The method of claim 1, wherein the selectively executing step includes associating the XML element to the executable audio resource in response to detecting the XML element inlined into the HTML page.

15. The method of claim 14, wherein the associating step includes determining an association between the XML element and the executable audio resource based on accessing stored configuration settings for the web browser.

16. The method of claim 1, wherein the selectively executing step includes instantiating the executable audio resource by the browser in response to an embedded tag in the HTML page.

17. The method of claim 1, wherein the selectively executing step includes ignoring by the web browser the XML element based on an absence of the executable audio resource by the device.

18. A computer readable medium having stored thereon sequences of instructions for executing a web browser by a device according to hypertext transport (HTTP) protocol, the sequences of instructions including instructions for performing the steps of:
    receiving a hypertext markup language (HTML) page, from an HTTP connection, having at least one extensible markup language (XML) element for controlling execution of an audio operation to be performed by an executable audio resource; and
    selectively executing by the web browser the audio operation based on detection of the executable audio resource in the device by the web browser, including interpreting the at least one XML element by the executable audio resource in the device for the controlled execution of the audio operation;
    wherein the selectively executing step includes executing the audio operation based on execution of the executable resource within the HTML page;
    wherein the executable resource is a Java resource, the executing step including instantiating the Java resource by the web browser in response to parsing the XML element embedded within the HTML page.

19. The medium of claim 18, wherein the selectively executing step includes executing the audio operation based on detection of the executable audio resource in the device as an executable plug-in resource registered with the web browser.

20. The medium of claim 19, wherein the XML element specifies playing a plurality of prescribed audio files as a prompt for a user, the selectively executing step including playing the prescribed audio files in a sequence specified by the XML element.

21. The medium of claim 20, wherein the playing step includes playing the prescribed audio files as concatenated prompts according to the sequence specified by the XML element.

22. The medium of claim 21, wherein the playing step further includes interrupting the concatenated prompts in response to a detected user input, further including:
    posting the detected user input via the HTTP connection to a Uniform Resource Locator (URL) specified in the HTML page;

receiving a second HTML page from the HTTP connection having a second XML element for controlling execution of a second audio operation to be performed by the executable audio resource; and selectively executing the second audio operation based on detection of the executable audio resource.

23. The medium of claim 20, wherein the HTML page includes a second XML element for controlling execution of one of a plurality of audio operations to be performed by the executable audio resource based on a corresponding user input, the medium further including instructions for executing the one audio operation by the executable audio resource based on the corresponding user input.

24. The medium of claim 23, wherein the step of executing the one audio operation includes initiating execution of the one audio operation in response to receiving a prescribed single key input as the user input.

25. The medium of claim 24, wherein the step of initiating execution of the one audio operation includes submitting the prescribed single key input according to HTTP protocol to a destination specified in the second XML element.

26. The medium of claim 23, wherein the step of executing the one audio operation includes initiating execution of the one audio operation in response to collection of a prescribed number of key inputs as the user input.

27. The medium of claim 23, wherein the step of initiating execution of the one audio operation includes recording a voice input and sending the recorded voice input according to HTTP protocol to a destination specified in the second XML element.

28. The medium of claim 27, further comprising posting a user input, that describes the recorded voice input, by the browser to a second destination specified by the HTML page in a prescribed sequence relative to the sending of the recorded voice input.

29. The medium of claim 18, wherein the step of selectively executing the audio operation includes recording, by the executable audio resource, a voice input and sending the recorded voice input according to HTTP protocol to a destination specified in the XML element.

30. The medium of claim 29, further comprising posting a user input, that describes the recorded voice input, by the browser to a second destination specified by the HTML page in a prescribed sequence relative to the sending of the recorded voice input.

31. The medium of claim 18, wherein the selectively executing step includes associating the XML element to the executable audio resource in response to detecting the XML element inlined into the HTML page.

32. The medium of claim 31, wherein the associating step includes determining an association between the XML element and the executable audio resource based on accessing stored configuration settings for the web browser.

33. The medium of claim 18, wherein the selectively executing step includes instantiating the executable audio resource by the browser in response to parsing an embedded tag in the HTML page.

34. The medium of claim 18, wherein the selectively executing step includes ignoring by the web browser the XML element based on an absence of the executable audio resource by the device.

35. A processor-based device configured for executing audio operations based on a hypertext markup language (HTML) page received from a server according to hypertext transport protocol (HTTP), the device comprising:

a web browser configured for selectively interpreting the HTML page, the HTML page including HTML tags and an XML element for controlling execution of an audio operation by an executable audio resource, the web browser selectively executing the audio operation specified by the XML element based on a determined presence of the executable audio resource in the device by the web browser, and based on the executable audio resource interpreting the XML element for the controlled execution of the audio operation;

wherein the web browser executes the audio operation based on detection of the executable audio resource embedded in the HTML page;

wherein the executable audio resource is a Java resource, the web browser instantiating the Java resource in response to parsing the XML element as an embedded tag within the HTML page.

36. The device of claim 35, further comprising an executable plug-in resource registered with the web browser as said executable audio resource, the web browser initiating a call to the plug-in resource in response to detecting the XML element inlined into the HTML page.

37. The device of claim 35, wherein the web browser is configured for playing a plurality of prescribed audio files, specified by the XML element, in a sequence specified by the XML element.

38. The device of claim 37, wherein the web browser is configured for playing the prescribed audio files as concatenated prompts based on concatenation data specified by the XML element.

39. The device of claim 35, wherein the web browser is configured for executing the audio operation by recording a voice input, and sending the recorded voice input according to HTTP protocol to a destination specified by the XML element.

40. The device of claim 39, wherein the web browser is configured for posting a user input, that describes the recorded voice input, by the browser to a second destination specified by the HTML page in a prescribed sequence relative to the sending of the recorded voice input.

* * * * *